(12) United States Patent
Konuma et al.

(10) Patent No.: US 7,198,733 B2
(45) Date of Patent: Apr. 3, 2007

(54) FORMED SUBSTRATE USED FOR SOLID ELECTROLYTIC CAPACITOR, PRODUCTION METHOD THEREOF AND SOLID ELECTROLYTIC CAPACITOR USING THE SUBSTRATE

(75) Inventors: Hiroshi Konuma, Nagano (JP);
Katsuhiko Yamazaki, Nagano (JP);
Takenori Umikawa, Nagano (JP);
Masakazu Yagi, Chiba (JP); Tamotsu Yamashita, Chiba (JP)

(73) Assignee: Showa Denko K.K., Tokyo (JP)

( * ) Notice: Subject to any disclaimer, the term of this patent is extended or adjusted under 35 U.S.C. 154(b) by 450 days.

(21) Appl. No.: 10/479,053

(22) PCT Filed: Jun. 11, 2002

(86) PCT No.: PCT/JP02/05785

§ 371 (c)(1),
(2), (4) Date: Nov. 26, 2003

(87) PCT Pub. No.: WO02/103727

PCT Pub. Date: Dec. 27, 2002

(65) Prior Publication Data

US 2004/0149961 A1    Aug. 5, 2004

Related U.S. Application Data

(60) Provisional application No. 60/322,426, filed on Sep. 17, 2001, provisional application No. 60/299,769, filed on Jun. 22, 2001.

(30) Foreign Application Priority Data

Jun. 15, 2001 (JP) .............................. 2001-181643
Sep. 7, 2001 (JP) .............................. 2001-271737

(51) Int. Cl.
*H01G 9/00* (2006.01)
*H01B 1/08* (2006.01)
*H01B 1/12* (2006.01)

(52) U.S. Cl. ................... 252/500; 252/518.1; 252/511; 361/523; 361/528; 361/529; 361/525; 29/25.03; 428/210; 427/80

(58) Field of Classification Search ............... 252/62.2, 252/500, 511; 361/523–529
See application file for complete search history.

(56) References Cited

U.S. PATENT DOCUMENTS 4,666,452 A * 5/1987 Nohr et al. ................. 8/115.52

(Continued)

FOREIGN PATENT DOCUMENTS

JP       55-28411       7/1980

(Continued)

OTHER PUBLICATIONS

International Search Report for PCT/JP02/05785 dated Sep. 17, 2002.

*Primary Examiner*—Mark Kopec
*Assistant Examiner*—Kallambella Vijayakumar
(74) *Attorney, Agent, or Firm*—Sughrue Mion, PLLC

(57) ABSTRACT

A formed substrate, wherein the surface of the valve-acting metal having a dielectric film is at least partially covered with an oxide comprising Si, valve-acting metal element and oxygen, preferably, wherein the content of Si in the formed foil having an aluminum oxide dielectric film decreases continuously from the surface of the dielectric film toward the inner part in some regions in the aluminum dielectric film thickness; a method for producing the formed substrate; and a solid electrolytic capacitor comprising a solid electrolyte on the formed substrate. A solid electrolytic capacitor manufactured by using a formed substrate according to the present invention, improved in adhesion to an electrically conducting polymer (solid electrolyte) with its area coverage contacting the polymer being sufficiently large, is increased in the electrostatic capacitance among individual capacitors and improved in the LC yield as compared with capacitors otherwise manufactured.

21 Claims, 6 Drawing Sheets a profile of the Si content ratio in thickness of the film depth from the surface /nm

U.S. PATENT DOCUMENTS

| | | |
|---|---|---|
| 4,910,645 A | 3/1990 | Jonas et al. |
| 5,140,502 A * | 8/1992 | Kudoh et al. ............... 361/540 |
| 5,424,907 A * | 6/1995 | Kojima et al. .............. 361/532 |
| 5,530,139 A | 6/1996 | Saida et al. |
| 5,621,608 A * | 4/1997 | Arai et al. .................. 361/525 |
| 6,229,689 B1 * | 5/2001 | Kobayashi et al. ......... 361/525 |

FOREIGN PATENT DOCUMENTS

| | | |
|---|---|---|
| JP | 57-6250 | 2/1982 |
| JP | 62-268122 | 11/1987 |
| JP | 2-15611 | 1/1990 |
| JP | 8-3156 | 1/1996 |
| JP | 10-32145 | 2/1998 |
| JP | 10-032145 * | 2/1998 |
| JP | 10-032146 * | 2/1998 |
| JP | 10-32146 A | 2/1998 |
| JP | 2000-173866 | 6/2000 |
| JP | 2000-348984 * | 12/2000 |
| JP | 2000-348984 A | 12/2000 |

* cited by examiner (A)

(B)

(C)

(D)

a profile of the Si content ratio in thickness of the film

FORMED SUBSTRATE USED FOR SOLID ELECTROLYTIC CAPACITOR, PRODUCTION METHOD THEREOF AND SOLID ELECTROLYTIC CAPACITOR USING THE SUBSTRATE

CROSS-REFERENCE TO RELATED APPLICATIONS

This application is based on the provisions of 35 U.S.C. Article 111(a) with claiming the benefit of filing dates of U.S. provisional application Ser. No. 60/299,769 filed on Jun. 22, 2001 and U.S. provisional application Ser. No. 60/322,426 filed on Sep. 17, 2001, under the provisions of 35 U.S.C. 111(b), pursuant to 35 U.S.C. Article 119(e)(1).

TECHNICAL FIELD

The present invention relates to a valve-acting metal having a dielectric film, particularly a formed foil having an aluminum oxide dielectric film, which is at least partially covered with a specific oxide, production method thereof, and also relates to an electrolytic capacitor using the metal material. More specifically, the present invention relates to a valve-acting metal formed foil having a dielectric film covered with an oxide comprising Si, valve-acting metal and oxygen(O), for example, a formed aluminum foil having an aluminum oxide dielectric film at least partially covered with an oxide comprising Si, Al and O, production method thereof, and also relates to an electrolytic capacitor using the formed foil.

BACKGROUND ART

In the fundamental structure of a solid electrolytic capacitor, a high-density and uniform oxide dielectric film is formed on the surface of a valve-acting metal previously etched to roughen the surface, such as aluminum, tantalum, titanium or niobium, an electrically conducting polymer, for example, is formed on the oxide dielectric film to work out to a solid electrolyte, an anode lead wire is connected to the anode terminal (the metal surface area with no solid electrolyte) of the valve-acting metal, and a cathode lead wire is connected to the electrically conducting layer comprising the electrically conducting polymer. This structure as a whole is then sealed with an insulating resin such as epoxy resin to complete a solid electrolytic capacitor.

Among the above-described valve-acting metals, aluminum is advantageous in that the surface area can be easily enlarged by etching, the oxide film formed on its surface by anodization (electrochemical forming) using the aluminum as anode can be utilized as a dielectric material and therefore, a smaller-size and larger-capacitance solid electrolytic capacitor can be less expensively produced as compared with other capacitors. Therefore, the aluminum solid electrolytic capacitor is being widely used.

The etching of aluminum is generally performed by A.C. (alternating current) etching in an electrolytic solution containing chlorine ion and the like. By this etching, a large number of pores are formed on the surface and the surface area is enlarged. The radius of the pore thus formed varies depending on the current applied and the etching time, however, it is approximately from 0.05 to 1.0 µm.

The surface including the pores is then subjected to anodization (electrochemical forming). By this electrochemical forming, a high-density and uniform anode oxide film (dielectric film) having a thickness of approximately from 0.005 to 0.1 µm is formed.

The formed aluminum substrate obtained is cut into the predetermined size of a solid electrolytic capacitor. At this time, an extruded portion (bur) remains at the cut end edge, however, this exposed aluminum (ground metal) portion is again electrochemically formed as it is to form an anode oxide film (dielectric film) on the cut end part.

As for the method of increasing an electrostatic capacitance, JP-B-57-6250 (the term "JP-B" as used herein means an "examined Japanese patent publication") describes a technique of subjecting a formed or etched foil to a boiling treatment (hot water treatment) with an aqueous sodium silicate solution. This method is effective for a formed foil obtained by the electrochemical forming at a forming voltage of 20 to 300 V but fails in increasing the electrostatic capacitance of a low-voltage foil obtained at a forming voltage of less than 20 V.

Also, Capacitor Gijutsu (Capacitor Techniques), Vol. 8 (No. 1), pp. 21–28, Denki Kagaku Kai (2001) (First Research Meeting in 2001) describes a technique of a sol-gel coating or the like for the development of aluminum electrolytic capacitors. According to this method, $SiO_2$ or the like is sol-gel covered and anodized in a neutral solution to form a composite oxide of Al and Si. The composite oxide of Al and Si is formed between $SiO_2$ layer and $Al_2O_3$ layer at 200 V, and the $SiO_2$ layer disappears at 400 V. As a result, an electrolytic capacitor improved in the dielectric constant and increased in the capacitance is produced.

The electrostatic capacitance of a capacitor device is determined by the thickness of the dielectric film, the dielectric constant of the dielectric film and the area coverage of a solid electrolyte (electrically conducting substance) on the dielectric film. However, the electrostatic capacitance of conventional aluminum solid electrolytic capacitors does not agree with the theoretical electrostatic capacitance (C) of a formed aluminum foil ($C=\epsilon A/t$, wherein $\epsilon$ is a dielectric constant of an aluminum oxide dielectric material, A is a surface area of a dielectric layer and t is a thickness of a dielectric material). Moreover, the electrostatic capacitance is greatly dispersed among individual products.

As the electrochemical forming voltage decreases, the electrostatic capacitance of an aluminum solid electrolytic capacitor using the electrochemically formed foil is liable to estrange at a larger ratio from the theoretical electrostatic capacitance of the formed aluminum foil. This phenomenon is considered to occur because the thickness and dielectric constant of the dielectric film, the area coverage and adhesion of the solid electrolyte (electrically conducting substance) on or to the dielectric film, and the like are insufficient in conventional electrochemical forming techniques.

DISCLOSURE OF THE INVENTION

Accordingly, the object of the present invention is to provide an electrolytic capacitor improved in the electrostatic capacitance and reduced in the dispersion of the capacitor performance, where the oxide dielectric film on a formed substrate is surface-treated to yield a dielectric film such that an electrically conducting substance provided on the film can contact with the film over a sufficiently large contact area with good adhesion.

As a result of extensive investigations to solve the above-described problems, the present inventors have found that when a formed foil having thereon an aluminum oxide dielectric film covered by an oxide comprising Si (silicon), a valve-acting metal and O (oxygen), for example, Si, Al and O, the area coverage of a solid electrolyte (electrically conducting polymer) on the dielectric film is increased, the adhesive property therebetween and the like are improved, the electrostatic capacitance of the capacitor is in turn increased, and the dispersion of electrostatic capacitance among individual capacitors and the leakage current are reduced.

Moreover, the present inventors have found that by using a formed foil having a dielectric film of aluminum oxide whose surface is modified with Si and containing Si inside wherein the amount of Si decreases continuously toward the inner part in some regions, the area coverage of a solid electrolyte (electrically conducting polymer) on the dielectric film is increased and the adhesive property between the solid electrolyte and the dielectric film is improved to increase the electrostatic capacitance while the dispersion of electrostatic capacitance among individual capacitors and the leakage current are reduced. Still further, the present inventors have found that it is more preferable to use a formed foil having regions where the continuous decrease of Si content ratio from the surface toward the inner part, which is measured by TEM-EDX(TEM: transmission electron microscope, EDX: energy dispersive X-ray spectroscopy), occurs at a specific rate.

That is, the present invention provides a formed substrate used for solid electrolytic capacitor, production method thereof and solid electrolytic capacitor using the substrate.

More specifically, the present invention provides the following formed substrate used for solid electrolytic capacitor, production method thereof and solid electrolytic capacitor using the substrate:

1) a formed substrate, which is a valve-acting metal substrate having a dielectric film, wherein the surface of the valve-acting metal having a dielectric film is at least partially covered with an oxide comprising Si, valve-acting metal element and O;

2) the formed substrate as described in 1) above, wherein the valve-acting metal substrate is one member selected from aluminum, tantalum, titanium, niobium and an alloy thereof;

3) the formed substrate as described in 1) above, wherein the valve-acting metal substrate is a formed aluminum foil or plate;

4) the formed substrate as described in 2) or 3) above, wherein in the XPS analysis on the surface of the formed substrate having an aluminum oxide dielectric film at least partially covered with an oxide comprising Si, Al and O, when the binding energy of Si metal is 99.7 eV and the binding energy of Si in $SiO_2$ is 103.4 eV, the binding energy of Si in the oxide is from 100.0 to 103.2 eV;

5) the formed substrate as described in 2) or 3) above, wherein in the XPS analysis on the surface of the formed substrate having an aluminum oxide dielectric film at least partially covered with an oxide comprising Si, Al and O, when the binding energy of O in $Al_2O_3$ is 531.0 eV and the binding energy of O in $SiO_2$ is 532.5 eV, the binding energy of O in the oxide is from 529.0 to 532.3 eV;

6) the formed substrate as described in 4) or 5) above, wherein the oxide comprising Si, Al and O contains a compound having an Si—O—Al bond;

7) the formed substrate as described in 2) or 3) above, comprising a formed foil having an aluminum oxide dielectric film with the surface modified with Si, wherein the content of Si present in the formed foil decreases continuously from the surface of the aluminum oxide dielectric film toward the inner part in some regions in thickness of the aluminum oxide dielectric film;

8) the formed substrate as described in 7) above, comprising a formed foil having an aluminum oxide dielectric film with the surface modified with Si, wherein the content ratio of Si measured by TEM-EDX and defined by the following formula:

$$\text{Si content ratio} = \frac{(Si) \; mol}{(Si) \; mol + (Al) \; mol}$$

is 4% or more at the surface side and decreases continuously toward the inner part at a rate of 0.5%/nm or more in some regions in thickness of the aluminum oxide dielectric film;

9) the formed substrate as described in any one of 1) to 8) above, wherein the valve-acting metal substrate having a dielectric film is electrochemically formed at a voltage of less than 20 V;

10) a production method of the formed substrate described in 1) above, wherein the valve-acting metal substrate which is one member selected from aluminum, tantalum, titanium, niobium and an alloy thereof is subjected to electrochemical formation using an electrolytic solution containing alkali silicate and the surface of the valve-acting metal is at least partially covered with an oxide comprising Si, valve-acting metal element and O;

11) the production method of a formed substrate as described in 10) above, wherein the valve-acting metal substrate is aluminum and an alloy thereof and is subjected to electrochemical formation using an electrolytic solution containing alkali silicate and the surface of the valve-acting metal is at least partially covered with an oxide comprising Si, valve-acting metal element and O;

12) the production method of the formed aluminum substrate as described in 11) above, comprising a step of electrochemically forming the aluminum substrate using an electrolytic solution containing an acid and/or a salt thereof and a step of electrochemically forming the substrate using an electrolytic solution containing alkali silicate, wherein the surface of the valve-acting metal is at least partially covered with an oxide comprising Si, aluminum and O;

13) the production method of the formed aluminum substrate as described in 11) above, comprising a step of electrochemically forming the aluminum substrate using an electrolytic solution containing an acid and/or a salt thereof, a step of electrochemically forming the substrate using an electrolytic solution containing alkali silicate, and a step of treating the substrate with heat, wherein the surface of the valve-acting metal is at least partially covered with an oxide comprising Si, aluminum and O;

14) the production method of the formed aluminum substrate as described in any one of 10) to 13) above, wherein the concentration of the electrolytic solution containing alkali silicate is within the range of 0.001 to 15 mass %;

15) the production method of the formed aluminum substrate as described in any one of 10) to 14) above, wherein the temperature of the electrolytic solution containing alkali silicate is within the range of 10 to 100° C.;

16) the production method of the formed aluminum substrate as described in any one of 10) to 15) above, wherein alkali silicate contained in the electrolytic solution is at least one selected from the group consisting of potassium silicate, sodium silicate, calcium silicate and lithium silicate;

17) the production method of the formed aluminum substrate as described in any one of 11) to 16) above, wherein the electrochemical formation (a step of electrochemically forming) is performed at a voltage of less than 20 V;

18) a solid electrolytic capacitor comprising a solid electrolyte formed on the formed substrate as described in any one of 1) to 9) above;

19) a solid electrolytic capacitor comprising a solid electrolyte formed on the formed substrate obtained by the method as described in any one of 10) to 17) above;

20) the solid electrolytic capacitor as described in 18) or 19) above, wherein the solid electrolyte comprises a π electron-conjugate polymer;

21) the solid electrolytic capacitor as described in 20) above, wherein the π electron-conjugate polymer is a polymer obtained from a 5-membered heterocyclic compound;

22) the solid electrolytic capacitor as described in 21) above, wherein the 5-memebered heterocyclic compound is at least one member selected from the group consisting of pyrrole, thiophene, furan, isothianaphthene, 1,3-dihydroisothianaphthene and substitution derivatives thereof;

23) the solid electrolytic capacitor as described in 22) above, wherein the 5-memebered heterocyclic compound is at least one member selected from the group consisting of 3,4-ethylenedioxythiophene and 1,3-dihydroisothianaphthene; and 24) the solid electrolytic capacitor as described in any one of 18) to 23) above, wherein the solid electrolytic capacitor is obtained by stacking two or more sheets of capacitor elements.

DETAILED DESCRIPTION OF INVENTION

Figure 1:
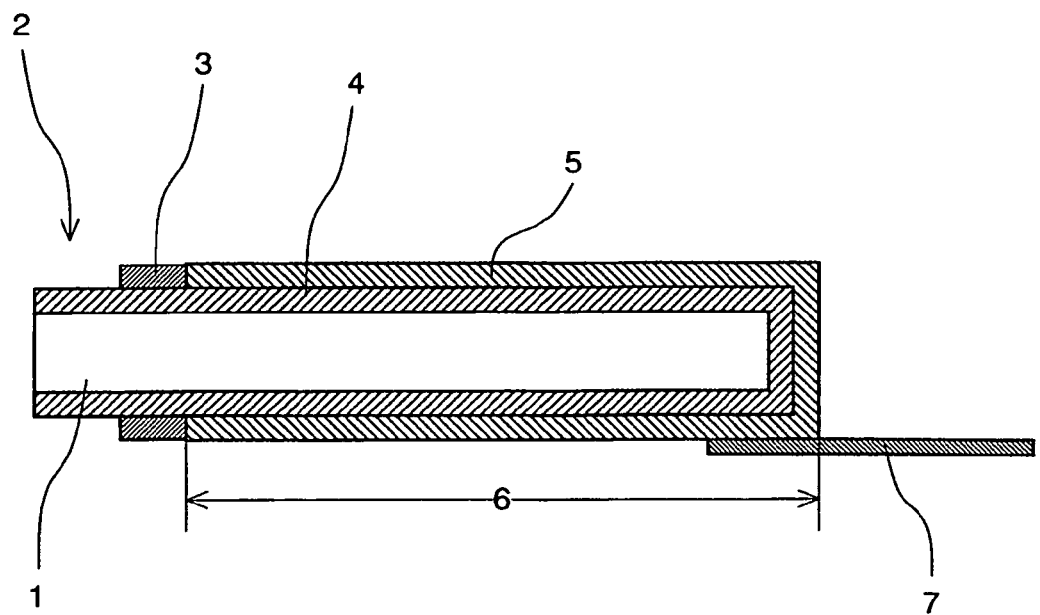
FIG. 1 is a cross-sectional view showing the solid electrolytic capacitor element of the present invention.

The present invention is described in detail below.

The formed substrate of the present invention, wherein the valve-acting metal substrate is one member selected from aluminum, tantalum, titanium, niobium and an alloy thereof, can be used for a solid electrolytic capacitor preferably having a solid electrolyte on the substrate. For example, an aluminum solid electrolytic capacitor has been heretofore produced by a method of cutting a commercially available formed aluminum foil having thereon an aluminum oxide dielectric film into a predetermined shape required for producing a solid electrolytic capacitor, again electrically forming the aluminum ground metal portion on the cut end face, and then providing an electrically conducting polymer layer. However, solid electrolytic capacitors obtained by such a method are dispersed in the electrostatic capacitance as described above.

The present inventors have found that when a formed foil substrate having an aluminum oxide dielectric film at least partially covered with an oxide comprising Si, Al and O is used, surprisingly, the adhesion between the solid electrolyte (electrically conducting polymer) and the substrate is improved, as a result, the electrostatic capacitance of the obtained capacitor is elevated and also the dispersion of electrostatic capacitance among individual capacitors is reduced. Furthermore, it is confirmed that the increase of leakage current (LC) is greatly reduced and the yield of products (sometimes simply referred to as "yield") is improved.

The detailed reasons why the properties of the solid electrolytic capacitor are improved (the electrostatic capacitance increases and the dispersion decreases) are not necessarily clearly known, however, when a capacitor is manufactured from a formed aluminum foil having an aluminum oxide dielectric film covered with an oxide comprising Si, Al and O using an electrolytic solution (e.g., aqueous ammonium adipate solution) and measured on the electrostatic capacitance, the electrostatic capacitance is in the same level as that of capacitors manufactured using a formed foil obtained by a conventional method.

However, when a capacitor is manufactured using an organic electrically conducting polymer as the solid electrolyte, the electrostatic capacitance of the formed substrate (foil) of the present invention increases. From these results, it is considered that the dielectric film is increased in the adhesion to the electrically conducting polymer and a uniform and homogeneous contact area is obtained, as a result, the effective contact area is substantially increased.

The detailed reasons why the LC is decreased is not necessarily clearly known, however, this decrease is considered to occur because the aluminum oxide film is protected by the oxide comprising Si, Al and O and therefore, is increased in the film strength, as a result, the film can endure damages by mechanical impact or thermal shock, whereby the formed foil less suffers from the reduction in its original properties. These effects are outstanding in a low-voltage formed foil obtained at a voltage of less than 20 V.

For example, the formed aluminum foil treated with alkali silicate is analyzed by XPS (X-ray photoelectron spectroscopy), an oxide comprising Si, Al and O is detected and it is revealed that this oxide film is a factor of improving the above-described performance.

The XPS analysis can give information on the constituent elements of an analyte and their amounts and binding status and in general, the analysis area is a few mm or more, the analysis depth is hundreds of nm and the sensitivity is on the order of 0.1 to 1%.

As for the surface of the valve-acting metal, the non-uniformity in the secondary expansion on the surface (strictly, a surface layer and on taking account of the atmosphere where the material is placed, an interface layer) and the layer structure of the dielectric film in the depth direction are important features. The depth direction is not uniform. As for the state such that at least a part of the dielectric film on the valve-acting metal surface is covered with an oxide comprising Si, valve-acting metal element and O, the oxide layer may be inhomogeneous or may not have a uniform thickness and in the depth direction, an oxide layer, a transition layer between the oxide layer and a dielectric layer and/or a metal layer, and a metal layer are arranged as the depth increases.

The binding energy of the oxide comprising Si, Al and O is measured by XPS. The binding energy of Si obtained by XPS includes binding energies of inner shell electron (2p) of Si and that of Si atom, but the binding energy as referred to in the present invention is the binding energy of the inner shell electron (2p) of Si. The numerical value of binding energy differs depending on the measurement conditions and in the present invention, the binding energy of the oxide comprising Si, Al and O is expressed by the binding energy of Si obtained when the binding energy of Si in $SiO_2$ is 103.4 eV and the binding energy of Si metal is 99.7 eV or by the binding energy of O when the binding energy of O in $Al_2O_3$ is 531.0 eV and the binding energy of O in $SiO_2$ is 532.5 eV.

In the oxide of the present invention, the binding energy of Si by XPS analysis is from 100 to 103.2 eV, preferably from 102 to 103 eV, and the binding energy of O is from 529 to 532.3 eV, preferably from 530 to 532 eV.

The binding energy detected are those of Si, O, Al, P and C but Na and the like originated in alkali silicate used for the electrochemical forming are not detected. P is detected in a commercially available formed foil not subjected to the electrochemical forming of the present invention. C is similarly detected in metals or formed foils in the absence of C and therefore, is judged as a contaminant originated in the measurement environment. The binding energy of C in the adsorbed hydrocarbon components (C—C, C—H) is 284.6 eV and Si, O, Al and P are determined as originated in the electrochemical forming.

The oxide comprising Si, Al and O may contain a compound having an Si—O—Al bond and the Si content present in the oxide layer is from 5 to 50%, preferably from 10 to 45%, more preferably from 15 to 40%.

It is confirmed that by using a formed foil having an aluminum oxide dielectric film whose surface is modified with Si and containing Si inside wherein the amount of Si decreases continuously from the surface toward the inner part in some regions, the area coverage of a solid electrolyte on the dielectric film is increased and the adhesive property is improved to increase the electrostatic capacitance while the dispersion of electrostatic capacitance among individual capacitors and the leakage current are reduced. Furthermore, it is also confirmed that the increase of leakage current (LC) is greatly reduced and the yield of products is improved. Moreover, with respect to the Si content, it is confirmed that more preferably, the Si content ratio measured by TEM-EDX and defined as (Si) mol/((Si) mol+(Al) mol) is about 4% or more at the surface side and continuously decreases toward the inner part at a rate of about 0.5%/nm or more.

The detailed reasons for improvement in properties of the obtained solid electrolytic capacitor (i.e. reasons for increase in electrostatic capacitance and reduction in the dispersion of the capacitor performance among individual capacitors) are not necessarily known clearly. When a capacitor is manufactured from a formed foil having an aluminum oxide dielectric film whose surface is modified with Si using an electrolytic solution (e.g., aqueous ammonium adipate solution) and measured on the electrostatic capacitance, the electrostatic capacitance is in the same level as that of capacitors manufactured using a formed foil obtained by a conventional method. However, when a capacitor is manufactured using an organic electrically conducting polymer as the solid electrolyte, the electrostatic capacitance of the formed substrate (foil) of the present invention increases. From these results, it is considered that the dielectric film is increased in the adhesion to the electrically conducting polymer and a uniform and homogeneous contact area is obtained, as a result, the effective contact area is substantially increased.

The detailed reasons why the LC is decreased is not necessarily clearly known, however, this decrease is considered to occur because Si modifying the surface of the aluminum oxide film increases the film strength, as a result, the film can endure damages by mechanical impact or thermal shock, whereby the formed foil less suffers from the reduction in its original properties. Thus, it is revealed that the formed foil having a dielectric film, wherein Si is present inside and the content of Si decreases continuously toward the inner part in some regions, is a main factor in further improving the properties of the obtained capacitor.

In the case of cutting and then using a formed aluminum substrate, the cut end shape is not limited, however, the plate-like element may be sufficient if it has a width of 1 to 50 mm and a length of 1 to 50 mm, and preferably has a width of 2 to 20 mm and a length of 2 to 20 mm, more preferably a width of 2 to 5 mm and a length of 2 to 6 mm.

In the case of using a formed substrate which is already cut, the substrate is preferably subjected to an electrochemically forming treatment of the cut end portion. With respect to the conditions in the electrochemically forming of this cut end part, an electrolytic solution of an acid and/or a salt thereof, for example, an electrolytic solution containing at least one of phosphoric acid, oxalic acid, sulfuric acid and the like, is used and a constant-current electrochemically forming is performed using the core part of the formed substrate as an anode under the conditions such that the concentration of the electrolytic solution is from 0.1 to 30 mass %, the temperature is from 0 to 80° C., the current density is from 0.1 to 1,000 mA/cm$^2$ and the electrochemically forming time is 100 minutes or less.

The conditions are more preferably selected such that the concentration of the electrolytic solution is from 1 to 20 mass %, the temperature is from 20 to 50° C., the current density is from 1 to 400 mA/cm$^2$ and the electrochemically forming time is 60 minutes or less.

The above-described various conditions in the electrochemically forming, such as kind of electrolytic solution, concentration of electrolytic solution, temperature, current density and electrochemically forming time, can be freely selected unless the dielectric film already formed on the surface of the formed substrate is not collapsed or deteriorated.

Even in the case of using, for example, a commercially formed aluminum substrate electrochemically formed at a low-voltage of less than 20 V, the electrolytic capacitor of the present invention using a formed foil obtained by coating an oxide comprising Si, Al and O on the dielectric film (aluminum oxide) can be reduced in the dispersion of electrostatic capacitance.

The oxide comprising Si, Al and O can be formed by various means. For example, the oxide can be formed on the aluminum oxide surface by a method using a hot aqueous solution containing alkali silicate or a method of performing the anodization using an electrolytic solution containing alkali silicate.

As for the anodization using an electrolytic solution containing alkali silicate, the alkali silicate used may be sufficient if it dissolves aluminum and aluminum oxide and examples of the alkali silicate which can be used include potassium silicate, sodium silicate, calcium silicate and lithium silicate. An alkali silicate soluble in water can be obtained by fusing an alkali hydroxide or an alkali carbonate with a silicate (a salt comprising $SiO_2$ and a metal oxide, represented by the formula: $xM_2O \cdot ySiO_2$).

In view of workability, the concentration of the alkali silicate is selected from the range of giving an appropriate dissolution rate of the dielectric material. The concentration varies depending on the kind of the alkali silicate, however, sodium silicate and potassium silicate are preferred. For example, in the case of sodium silicate, the concentration is from 0.001 to 15 mass %, preferably from 0.01 to 10 mass %, more preferably from 0.05 to 5 mass %.

The electrochemical forming temperature in an electrolytic solution containing alkali silicate varies depending on the kind, the concentration and the like of alkali silicate and cannot be indiscriminately specified, however, for example, in the case of sodium silicate, the electrochemically forming temperature is on the order of 10 to 100° C., preferably from 15 to 95° C., at a sodium silicate concentration of 0.01 to 10 mass %. The electrochemically forming temperature is preferably higher and a high temperature of not causing boiling is preferred as far as the level of the solution in which the substrate is dipped at the electrochemically forming can be controlled.

As for the current density and the electrochemically forming time at the electrochemically forming in the alkali silicate solution, a voltage and a time where the electrochemically forming can be performed without seriously impairing the dielectric film formed on the effective surface of the formed substrate, may be selected.

The heat treatment after the electrochemically forming with an alkali silicate is preferably performed at 100 to 500° C., more preferably from 200 to 400° C., where the dielectric film is not seriously damaged.

Subsequently, an electrochemically forming treatment may be performed, if desired, while not causing any damage on the dielectric film formed on the effective surface of the electrochemically formed substrate. Specifically, an electrolytic solution containing an acid and/or a salt thereof, such as adipic acid, boric acid and phosphoric acid, preferably a neutral salt such as ammonium adipate, is used and a constant-current electrochemically forming treatment is performed using the core part of the formed substrate as an anode under the conditions such that the concentration of the electrolytic solution is from 0.95 to 20 mass %, the temperature is from 0 to 90° C., the current density is from 0.1 to 2,000 $mA/cm^2$ and the current passing time is 60 minutes or less.

In a solid electrolytic capacitor according to the present invention, for example, as shown by the cross-sectional view of an embodiment of a capacitor element in FIG. 1, an electrically conducting polymer is formed as a solid electrolyte layer (5) on the formed aluminum substrate (1) having an aluminum oxide dielectric film (4) covered with an oxide comprising Si, Al and O.

The electrically conducting polymer for forming the solid electrolyte used in the solid electrolytic capacitor of the present invention is not limited, however, preferred examples thereof include electrically conducting polymers having a π electron-conjugate structure, such as electrically conducting polymers containing, as a repeating unit, a structure represented by a compound having a thiophene skeleton, a compound having a polycyclic sulfide skeleton, a compound having a pyrrole skeleton, a compound having a furan skeleton or the like.

Out of the monomers used as a starting material of the electrically conducting polymer, examples of the compound having a thiophene skeleton include derivatives such as 3-methylthiophene, 3-ethylthiophene, 3-propylthiophene, 3-butylthiophene, 3-pentylthiophene, 3-hexylthiophene, 3-heptylthiophene, 3-octylthiophene, 3-nonylthiophene, 3-decylthiophene, 3-fluorothiophene, 3-chlorothiophene, 3-bromothiophene, 3-cyanothiophene, 3,4-dimethylthiophene, 3,4-diethylthiophene, 3,4-butylenedioxythiophene, 3,4-methylenedioxythiophene and 3,4-ethylenedioxythiophene. These compounds may be a compound generally available on the market or may be prepared by a known method (the method described, for example, in Synthetic Metals, Vol. 15, page 169 (1986)).

Examples of the compound having a polycyclic sulfide skeleton include compounds having a 1,3-dihydro-polycyclic sulfide (also called 1,3-dihydrobenzo[c]thiophene) skeleton and compounds having a 1,3-dihydronaphtho[2,3-c]thiophene skeleton. Furthermore, compounds having a 1,3-dihydroanthra[2,3-c]-thiophene skeleton and compounds having a 1,3-dihydronaphthaceno[2,3-c]thiophene skeleton may be used. These compounds may be prepared by a known method, for example, the method described in JP-A-8-3156 (the term "JP-A" as used herein means an "unexamined published Japanese patent application") (U.S. Pat. No. 5,530,139).

In addition, for example, compounds having a 1,3-dihydronaphtho[1,2-c]thiophene skeleton, 1,3-dihydrophenanthra[2,3-c]thiophene derivatives, compounds having a 1,3-dihydrotriphenylo[2,3-c]thiophene skeleton, and 1,3-dihydrobenzo[a]anthraceno[7,8-c]thiophene derivatives may also be used.

Some compounds having arbitrarily nitrogen or N-oxide in the condensed ring may be used. Examples of such compounds include 1,3-dihydrothieno[3,4-b]quinoxaline, 1,3-dihydrothieno[3,4-b]quinoxaline-4-oxide and 1,3-dihydrothieno[3,4-b]quinoxaline-4,9-dioxide, however, the present invention is not limited thereto.

Examples of the compound having a pyrrole skeleton include derivatives such as 3-methylpyrrole, 3-ethylpyrrole, 3-propylpyrrole, 3-butylpyrrole, 3-pentylpyrrole, 3-hexylpyrrole, 3-heptylpyrrole, 3-octylpyrrole, 3-nonylpyrrole, 3-decylpyrrole, 3-fluoropyrrole, 3-chloropyrrole, 3-bromopyrrole, 3-cyanopyrrole, 3,4-dimethylpyrrole, 3,4-diethylpyrrole, 3,4-butylenepyrrole, 3,4-methylenedioxypyrrole and 3,4-ethylenedioxypyrrole, however, the present invention is not limited thereto. These compounds may be a commercially available product or may be prepared by a known method.

Examples of the compound having a furan skeleton include derivatives such as 3-methylfuran, 3-ethylfuran, 3-propylfuran, 3-butylfuran, 3-pentylfuran, 3-hexylfuran, 3-heptylfuran, 3-octylfuran, 3-nonylfuran, 3-decylfuran, 3-fluorofuran, 3-chlorofuran, 3-bromofuran, 3-cyanofuran, 3,4-dimethylfuran, 3,4-diethylfuran, 3,4-butylenefuran, 3,4-methylenedioxyfuran and 3,4-ethylenedioxyfuran, however, the present invention is not limited thereto. These compounds may be a commercially available product or may be prepared by a known method.

The polymerization may be electrolytic polymerization, chemical oxidation polymerization or a combination thereof. Other than these, a method of forming a solid electrolyte on a dielectric film, which is not an organic electrically conducting polymer, and then forming an organic electrically conducting polymer by the above-described polymerization method, may also be used.

Examples of the method for forming an organic electrically conducting polymer include a method where a 3,4-ethylenedioxythiophene monomer and an oxidizing agent each preferably in the form of a solution are coated separately one after another or simultaneously on a dielectric film to form an organic electrically conducting polymer as described in JP-A-2-15611, U.S. Pat. No. 4,910,645, JP-A-10-32145 and U.S. Pat. No. 6,229,689.

In the electrically conducting polymer, a compound having a doping ability (dopant) is generally used. The dopant may be added to either a monomer solution or an oxidizing agent solution. An organic sulfonic acid metal salt where a dopant and an oxidizing agent are the same compound may also be used. The dopant is preferably an arylsulfonate-based dopant and examples thereof include salts of a benzenesulfonic acid, a toluenesulfonic acid, a naphthalenesulfonic acid, an anthracenesulfonic acid and an anthraquinonesulfonic acid.

In order to attain good electric contact with the cathode lead terminal (7), an electrical conducting layer (not shown in Drawing) is preferably provided on the solid electrolyte layer (5) by applying an electrically conducting paste such as carbon paste or metal powder-containing paste or by metal plating (see, FIG. 1). Subsequently, a cathode lead terminal (7) is connected to the cathode part (6), an anode lead terminal (not shown in Drawing) is connected to the aluminum formed substrate (1) as an anode part, and an outer jacket is applied using, for example, resin molding, resin case, metal-made jacket case or resin dipping, whereby a solid electrolytic capacitor for various uses can be completed.

The multilayer solid electrolytic capacitor of the present invention is generally used as a multilayer capacitor where at least two sheets of capacitor elements are stacked. In the multilayer solid electrolytic capacitor, the lead frame (8) may be chamfered, more specifically, the lead frame may have flattened or rounded edge corner parts by slightly shaving these parts.

The opposing cathode bonding part and anode bonding part of the lead frame may also be allowed to serve as the lead terminals (7) and (10).

The material for the lead frame is not particularly limited insofar as it is a material commonly used. However, the lead frame is preferably constructed by a copper material (for example, Cu—Ni, Cu—Ag, Cu—Sn, Cu—Fe, Cu—Ni—Ag, Cu—Ni—Sn, Cu—Co—P, Cu—Zn—Mg or Cu—Sn—Ni—P alloy, etc.) or a material of which surface is plated with a copper material, because the resistance can be reduced by designing the shape of the lead frame or good workability can be attained in chamfering the lead frame.

Figure 2:
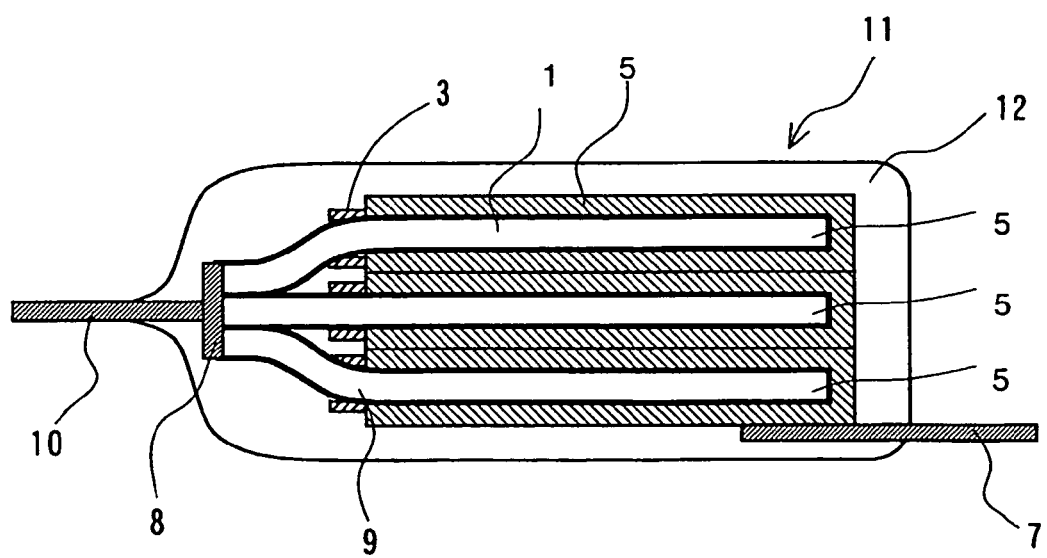
FIG. 2 is a cross-sectional view showing an example of the multi-layered solid electrolytic capacitor manufactured from the solid electrolytic capacitor element of the present invention.

As shown in the cross-sectional view of a multilayer solid electrolytic capacitor of FIG. 2, the multilayer solid electrolytic capacitor (11) is obtained by connecting a lead terminal (10) to the lead frame (8) bonded to the anode part (9), connecting a lead wire (7) to the cathode part (6) consisting of a solid electrolyte layer (5), a carbon paste layer and a metal powder-containing electrically conducting layer, and molding the whole with an insulating resin (12) such as epoxy resin.

BEST MODE FOR CARRYING OUT THE INVENTION

The present invention is described in greater detail below by referring to its representative examples. These examples are shown only for the purpose of explaining the present invention but the present invention is not limited thereto.

With respect to the following Examples, unless otherwise specified, in the evaluation of the leakage current property, the leakage current value (LC) was measured 1 minute after the application of a rated voltage (2 V) to the capacitor device, the measured value was calculated with a threshold value of 0.03 CV, the obtained value was used as a leakage current (LC) yield for the evaluation, and the obtained results are shown in Table 1.

EXAMPLE 1

A formed aluminum foil (110LJ22B4Vf, trade name, produced by Japan Capacitor Industrial Co., Ltd. (JCC)) (rated film withstand voltage: 4 Vf) was cut and divided into the cathode part and the anode part by a masking material (3). The side working out to a cathode part was electrochemically formed with an aqueous 5 mass % oxalic acid solution at 25° C. for 120 seconds and then washed with water.

Figure 3:
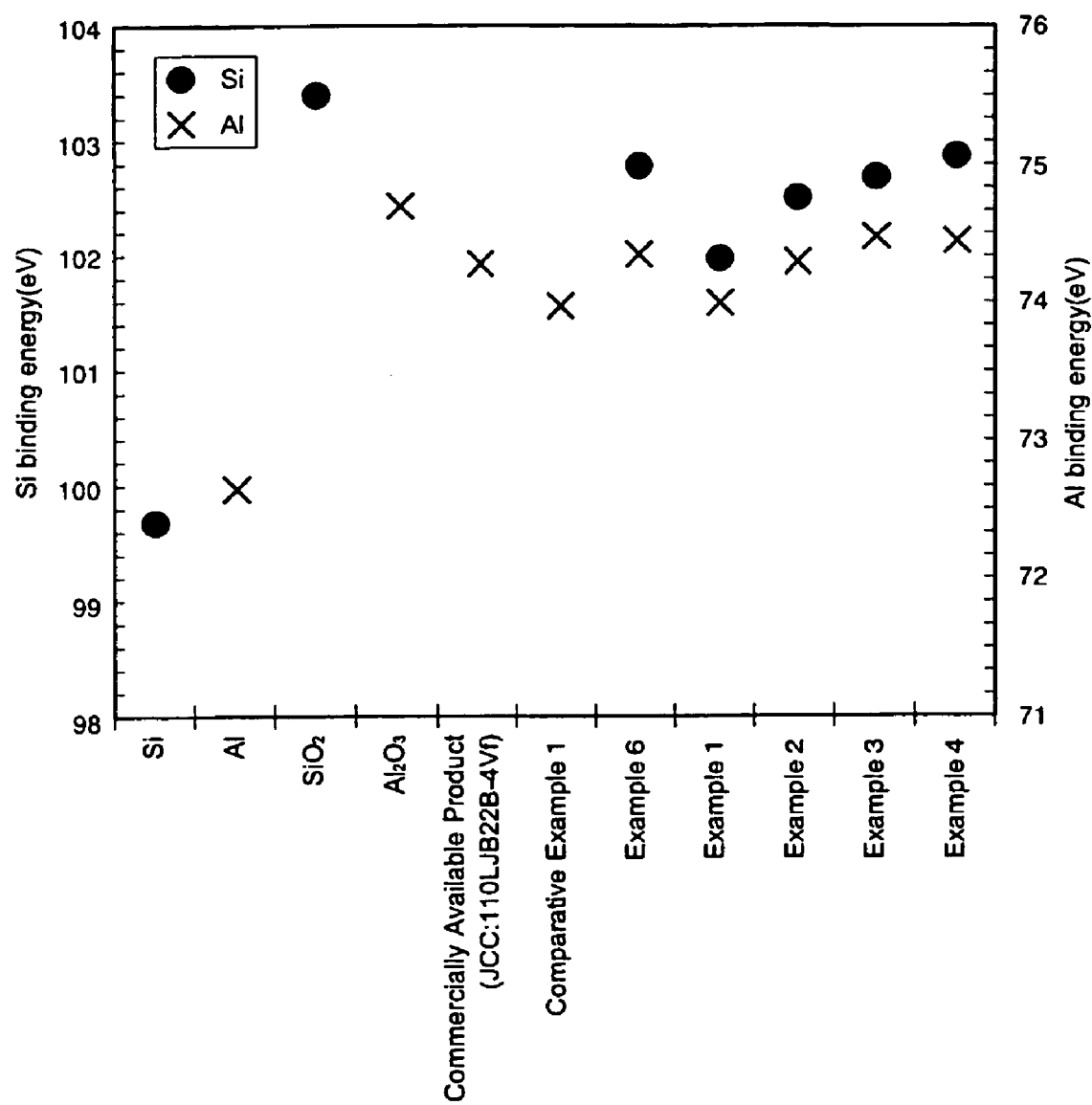
FIG. 3 shows XPS analysis results (left ordinate is Si binding energy (eV) and right ordinate is Al binding energy (eV)).
Figure 4:
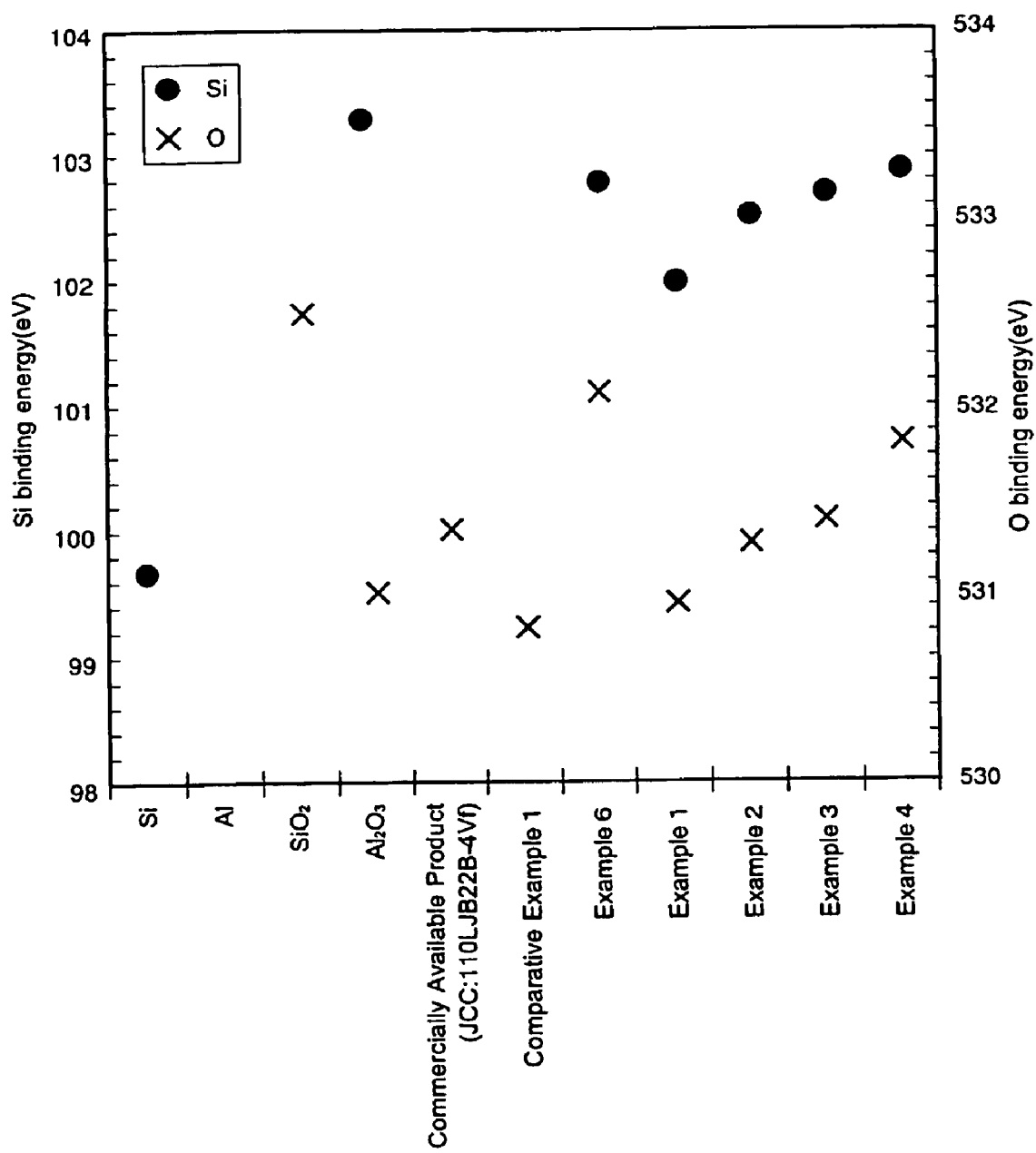
FIG. 4 shows XPS analysis results (left ordinate is Si binding energy (eV) and right ordinate is O binding energy (eV)).

Thereafter, the foil was electrochemically formed using an aqueous 0.1 mass % sodium silicate solution under the conditions such that the temperature was 40° C., the voltage was 4 V, the current density was 5 mA/cm$^2$ and the current passing time was 10 minutes. FIGS. 3 and 4 show the relationship of Si (101.97 eV), O (530.94 eV) and Al (73.98 eV) binding energy values when the foil at this stage was analyzed by XPS.

Subsequently, the resulting formed foil was heat-treated at 350° C. for 3 minutes and then electrochemically formed using an aqueous 10 mass % ammonium adipate solution as the electrolytic solution under the conditions such that the temperature was 55° C., the voltage was 4 V, the current density was 5 mA/cm$^2$ and the current passing time was 10 minutes. The electrochemically formed foil obtained through these treatments was measured on the electrostatic capacitance using 10 mass % ammonium adipate for the electrolytic solution. The results are shown in Table 1.

Thereafter, the cathode part was dipped in 1 mol/liter of an isopropyl alcohol solution of 3,4-ethylenedioxythiophene, left standing for 2 minutes, then dipped in a mixed aqueous solution of an oxidizing agent (1.8 mol/liter of ammonium persulfate) and a dopant (0.06 mol/liter of sodium anthraquinone-2-sulfonate), and left standing at 45° C. for 5 minutes. This process was repeated 25 times, the foil was washed with water, an electrically conducting polymer layer (5) was formed and thereon, a carbon paste and a silver paste were sequentially stacked to form an electrically conducting layer, thereby obtaining a capacitor element shown in FIG. 1. Subsequently, two sheets of the devices were superposed and disposed on a lead flame through a silver paste in the cathode side and by the welding in the anode side. Thereafter, the whole was molded with a resin for molding to complete a capacitor. After aging at 2 V and 105° C. for 1 hour, the electrostatic capacitance and the leakage current property were measured. The results obtained are shown in Table 1.

EXAMPLE 2

A formed aluminum foil (110LJ22B4Vf, trade name, produced by Japan Capacitor Industrial Co., Ltd. (JCC)) (rated film withstand voltage: 4 Vf) was cut and divided into the cathode part and the anode part by a masking material (3). The side working out to a cathode part was electrochemically formed with an aqueous 5 mass % oxalic acid solution at 25° C. for 120 seconds and then washed with water.

Subsequently, a capacitor was manufactured by the same operation as in Example 1 except for using an aqueous 0.5 mass % sodium silicate solution in place of an aqueous 0.1 mass % sodium silicate solution. The obtained capacitor was measured on the electrostatic capacitance and the leakage current property. The results are shown in Table 1. FIGS. 3 and 4 show the relationship of Si (102.50 eV), O (531.26 eV) and Al (74.28 eV) binding energy values when the foil at this stage was analyzed by XPS.

EXAMPLE 3

A formed aluminum foil (110LJ22B4Vf, trade name, produced by Japan Capacitor Industrial Co., Ltd. (JCC)) (rated film withstand voltage: 4 Vf) was cut and divided into the cathode part and the anode part by a masking material (3). The side working out to a cathode part was electrochemically formed with an aqueous 5 mass % oxalic acid solution at 25° C. for 120 seconds and then washed with water.

Subsequently, a capacitor was manufactured by the same operation as in Example 1 except for using an aqueous 1.0 mass % sodium silicate solution in place of an aqueous 0.1 mass % sodium silicate solution. The obtained capacitor was measured on the electrostatic capacitance and the leakage current property. The results are shown in Table 1. FIGS. 3 and 4 show the relationship of Si (102.68 eV), O (531.39 eV) and Al (74.48 eV) binding energy values when the foil at this stage was analyzed by XPS.

EXAMPLE 4

A formed aluminum foil (110LJ22B4Vf, trade name, produced by Japan Capacitor Industrial Co., Ltd. (JCC)) (rated film withstand voltage: 4 Vf) was cut and divided into the cathode part and the anode part by a masking material (3). The side working out to a cathode part was electrochemically formed with an aqueous 5 mass % oxalic acid solution at 25° C. for 120 seconds and then washed with water.

Subsequently, a capacitor was manufactured by the same operation as in Example 1 except for using an aqueous 5.0 mass % sodium silicate solution in place of an aqueous 0.1 mass % sodium silicate solution. The obtained capacitor was measured on the electrostatic capacitance and the leakage current property. The results are shown in Table 1. FIGS. 3 and 4 show the relationship of Si (102.86 eV), O (531.81 eV) and Al (74.43 eV) binding energy values when the foil at this stage was analyzed by XPS.

EXAMPLE 5

A capacitor was manufactured by the same operation as in Example 1 except for changing the formed foil to 13 Vf foil (100LJA19B13Vf, trade name, produced by Japan Capacitor Industrial Co., Ltd. (JCC)) (rated film withstand voltage: 13 Vf), using an aqueous 5.0 mass % sodium silicate solution and setting the electrochemically forming voltage to 13 V. After aging at 6.3 V and 105° C. for 1 hour, the electrostatic capacitance and the leakage current property were measured. The results are shown in Table 1.

The leakage current property was evaluated as follows. A leakage current value was measured 1 minute after the application of the rated voltage (6.3 V) to the capacitor element, the measured value was calculated with a threshold value of 0.03 CV and the obtained value was used as the leakage current yield for the evaluation.

EXAMPLE 6

A formed aluminum foil (110LJ22B4Vf, trade name, produced by Japan Capacitor Industrial Co., Ltd. (JCC)) (rated film withstand voltage: 4 Vf) was cut and divided into the cathode part and the anode part by a masking material (3). The side working out to a cathode part was electrochemically formed with an aqueous 5 mass % oxalic acid solution at 25° C. for 120 seconds and then washed with water.

Thereafter, the foil was heat-treated using an aqueous 1.0 mass % sodium silicate solution under the condition at a temperature of 80° C. FIGS. 3 and 4 show the relationship of Si (102.78 eV), O (532.07 eV) and Al (74.34 eV) binding energy values when the foil at this stage was analyzed by XPS.

Subsequently, the resulting formed foil was heat-treated at 350° C. for 3 minutes and then electrochemically formed using an aqueous 10 mass % ammonium adipate solution as the electrolytic solution under the conditions such that the temperature was 55° C., the voltage was 4 V, the current density was 5 mA/cm$^2$ and the current passing time was 10 minutes. The electrochemically formed foil obtained through these treatments was measured on the electrostatic capacitance using 10 mass % ammonium adipate for the electrolytic solution. The results are shown in Table 1.

Thereafter, the cathode part was dipped in 1 mol/liter of an ethanol solution of 1,3-dihydroisothianaphthene, left standing for 2 minutes, then dipped in a mixed aqueous solution of an oxidizing agent (1.0 mol/liter of iron persulfate) and a dopant (0.06 mol/liter of sodium dodecylbenzenesulfonate), and left standing at 80° C. for 10 minutes. This process was repeated 20 times, the foil was washed with water, an electrically conducting polymer layer was formed and thereon, a carbon paste and a silver paste were sequentially stacked to form an electrically conducting layer, thereby obtaining a capacitor element. Subsequently, two sheets of the devices were superposed and disposed on a lead flame through a silver paste in the cathode side and by the welding in the anode side. Thereafter, the whole was molded with a resin for molding to complete a capacitor. After aging at 2 V and 105° C. for 1 hour, the electrostatic capacitance and the leakage current property were measured. The results obtained are shown in Table 1.

COMPARATIVE EXAMPLE 1

A capacitor was manufactured by the same operation as in Example 1 except for using an aqueous 10 mass % ammonium adipate solution in place of an aqueous sodium silicate solution, and then measured on the electrostatic capacitance and the leakage current property. Also, the electrostatic capacitance of the electrochemically formed foil obtained through these electrochemical forming treatments was measured using 10 mass % ammonium adipate for the electrolytic solution. FIGS. 3 and 4 show the relationship of O (530.81 eV) and Al (73.96 eV) binding energy values when the foil at this stage was analyzed by XPS.

COMPARATIVE EXAMPLE 2

A capacitor was manufactured by the same operation as in Comparative Example 1 except for changing the formed foil 13 Vf foil (100LJA19B13Vf, trade name, produced by Japan Capacitor Industrial Co., Ltd. (JCC)) (rated film withstand voltage: 13 Vf) and the electrochemical forming voltage to 13 V. After aging at 6.3 V and 105° C. for 1 hour, the electrostatic capacitance and the leakage current property were measured. The results are shown in Table 1.

The leakage current property was evaluated as follows. A leakage current value was measured 1 minute after the application of the rated voltage (6.3 V) to the capacitor element, the measured value was calculated with a threshold value of 0.03 CV and the obtained value was used as the leakage current yield for the evaluation.

EXAMPLE 7

A capacitor was manufactured by the same operation as in Example 1 except for performing the electrochemical forming using 10 mass % ammonium adipate at 55° C. in place of 5 mass % oxalic acid at 25° C., and then measured on the electrostatic capacitance and the leakage current property. The results are shown in Table 1.

COMPARATIVE EXAMPLE 3

A capacitor was manufactured by the same operation as in Example 1 except for using an aqueous 10 mass % ammonium adipate solution in place of an aqueous sodium silicate solution, and then measured on the electrostatic capacitance and the leakage current property. Also, the electrostatic capacitance of the electrochemically formed foil obtained by the electrochemical forming treatment was measured using 10 mass % ammonium adipate as the electrolytic solution. The results are shown in Table 1.

COMPARATIVE EXAMPLE 4

A capacitor was manufactured by the same operation as in Example 1 except for performing a boiling treatment (hot water treatment) for 10 minutes in an aqueous 1 mass % sodium silicate solution at a temperature of 95° C. in place of performing the electrochemical forming with an aqueous 1 mass % sodium silicate solution, and then measured on the electrostatic capacitance and the leakage current property. Also, the electrostatic capacitance of the electrochemically formed foil obtained by the electrochemical forming treatment was measured using 10 mass % ammonium adipate as the electrolytic solution. The results are shown in Table 1.

COMPARATIVE EXAMPLE 5

A capacitor was manufactured by the same operation as in Comparative Example 3 except for changing the formed foil to 23 Vf foil (100LJA19B23Vf, trade name, produced by Japan Capacitor Industrial Co., Ltd. (JCC)) (rated film withstand voltage: 23 Vf) and the electrochemically forming voltage to 23 V. After aging at 10 V and 105° C. for 1 hour, the electrostatic capacitance and the leakage current property were measured. The results are shown in Table 1.

The leakage current property was evaluated as follows. A leakage current value was measured 1 minute after the application of the rated voltage (10 V) to the capacitor element, the measured value was calculated with a threshold value of 0.03 CV and the obtained value was used as the leakage current yield for the evaluation.

COMPARATIVE EXAMPLE 6

A capacitor element was manufactured by the same operation as in Example 1 except for changing the formed foil to 23 Vf foil (100LJA19B23Vf, trade name, produced by Japan Capacitor Industrial Co., Ltd. (JCC)) (rated film withstand voltage: 23Vf) and the electrochemically forming voltage to 23 V. After aging at 10 V and 105° C. for 1 hour, the electrostatic capacitance and the leakage current property were measured. The results are shown in Table 1.

TABLE 1

| | Electrostatic Capacitance ($\mu F$) | Deviation of Electrostatic Capacitance ($\mu F$) | LC (*1) Yield (%) | Capacitance (*2) of Formed Foil before Attaching of Solid Electrolyte ($\mu F/cm^2$) |
|---|---|---|---|---|
| Example 1 | 64.38 | 5.66 | 93 | 332 |
| Example 2 | 68.21 | 4.57 | 91 | 334 |
| Example 3 | 68.14 | 2.09 | 88 | 329 |
| Example 4 | 67.95 | 1.88 | 96 | 338 |
| Example 5 | 31.84 | 4.16 | 98 | 145 |
| Example 6 | 66.20 | 4.91 | 92 | 335 |
| Example 7 | 63.19 | 1.89 | 96 | — |
| Comparative Example 1 | 52.91 | 9.58 | 53 | 333 |
| Comparative Example 2 | 31.28 | 8.53 | 66 | 143 |
| Comparative Example 3 | 57.34 | 5.14 | 90 | 341 |
| Comparative Example 4 | 60.25 | 1.94 | 93 | 326 |
| Comparative Example 5 | 15.99 | 0.95 | 91 | — |
| Comparative Example 6 | 16.06 | 1.02 | 90 | — |

(*1) LC: leakage current
(*2) Electrostatic capacitance when a 10% ammonium adipate solution was used as the electrolytic solution.

It is seen from Table 1 that the formed foil obtained by the electrochemically forming with an aqueous sodium silicate solution is on the same level in the electrostatic capacitance ($\mu F/cm^2$) in the electrolytic solution as that of the foil not treated with sodium silicate (Comparative Examples 1 and 2), however, the electrostatic capacitance ($\mu F$) of the capacitor is increased (comparison of Examples 1 to 4 with Comparative Example 1, and comparison of Example 5 with Comparative Example 2). Furthermore, the electrostatic capacitance deviation (dispersion) and the leakage current yield (%) are also improved.

Also, it is seen from FIGS. 3 and 4 that the Si and O binding energies by XPS are different from those attributable to Si (103.40 eV) and O (532.85 eV) of $SiO_2$ or Si (99.15 eV) of Si metal. Furthermore, it is seen that the binding energy of O is not the O (530.55 eV) binding energy of $Al_2O_3$, either.

It is also seen from Table 1 that the electrochemically formed foil obtained by the electrochemically forming with an aqueous sodium silicate solution is not greatly different in the electrostatic capacitance in the electrolytic solution from the foil not treated with sodium silicate (Comparative Example 3) or the foil subjected to a boiling treatment with sodium silicate (Comparative Example 4), however, the electrostatic capacitance of the capacitor is increased. Furthermore, the electrostatic capacitance deviation (dispersion) and the leakage current yield are also improved.

In the case where the foil used is electrochemically formed at a voltage 20 V or more, the electrostatic capacitance of the capacitor is in the same level between the foil electrochemically formed with an aqueous sodium silicate solution (Comparative Example 6) and the foil not electrochemically formed with an aqueous sodium silicate solution (Comparative Example 5), and this reveals that the electrochemically forming with an aqueous sodium silicate solution has no remarkable effect.

EXAMPLE 8

A formed aluminum foil (110LJ22B4Vf, trade name, produced by Japan Capacitor Industrial Co., Ltd. (JCC)) (rated film withstand voltage: 4 Vf) was cut and divided into the cathode part and the anode part by a masking material (3). The side working out to a cathode part was electrochemically formed with an aqueous 5 mass % oxalic acid solution at 25° C. for 120 seconds and then washed with water.

Figure 5:
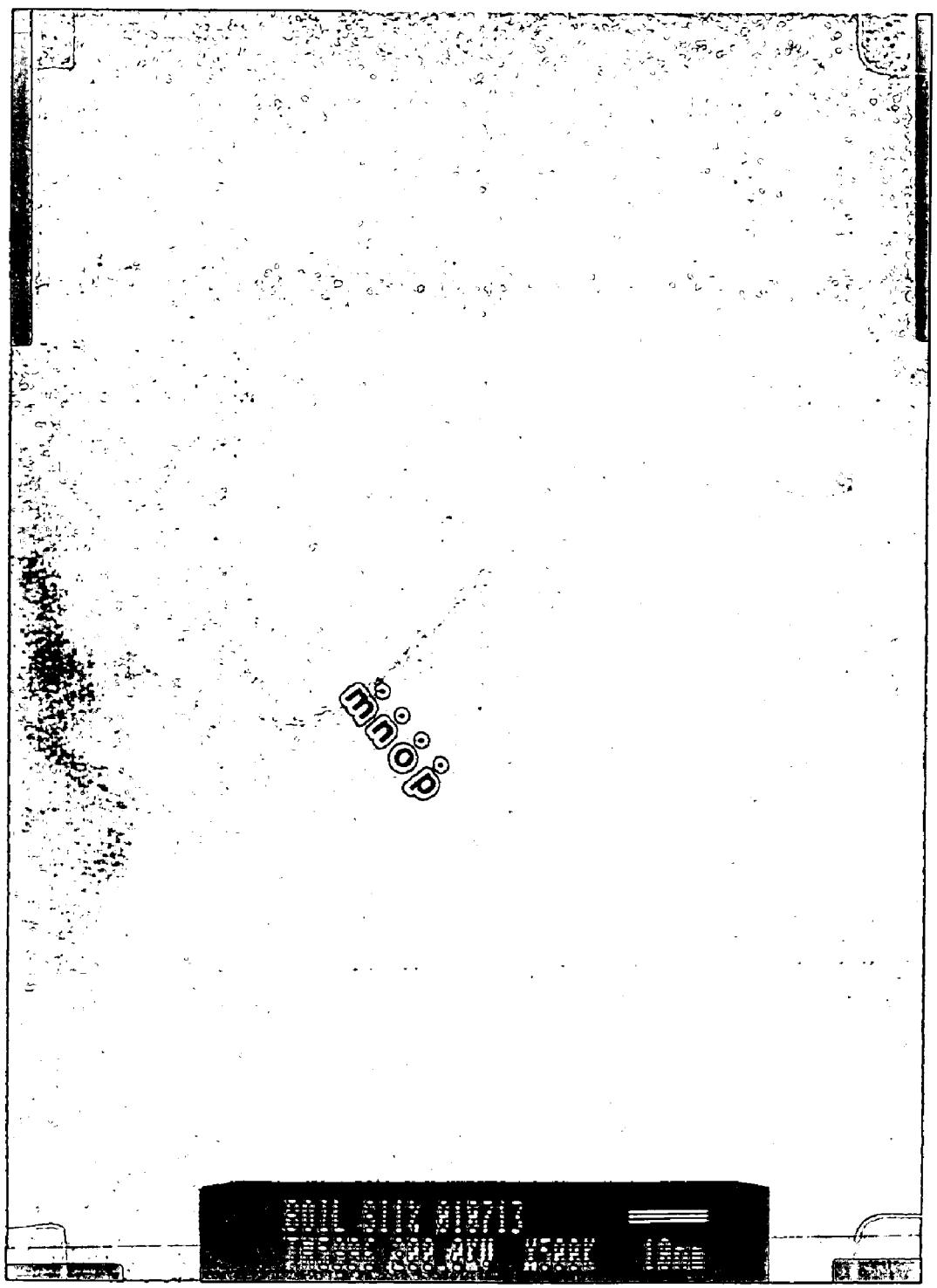
FIG. 5 is a TEM photograph showing a formed aluminum foil obtained in Examples.
Figure 6:
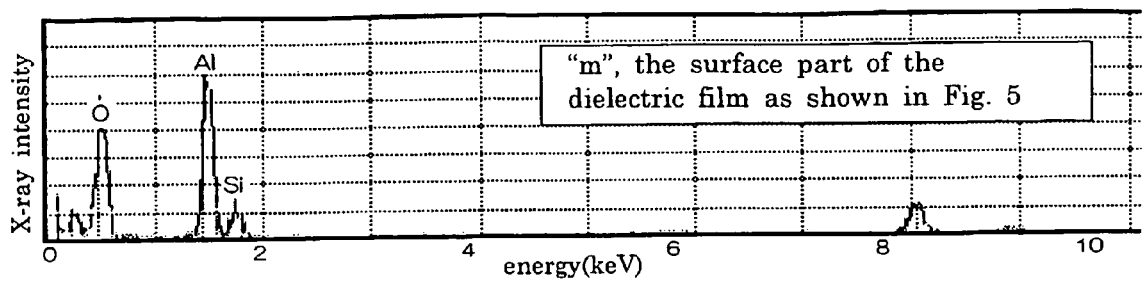
FIG. 6 shows EDX analysis results on the points "m", "n", "o" and "p" indicated in FIG. 5.
Figure 6:
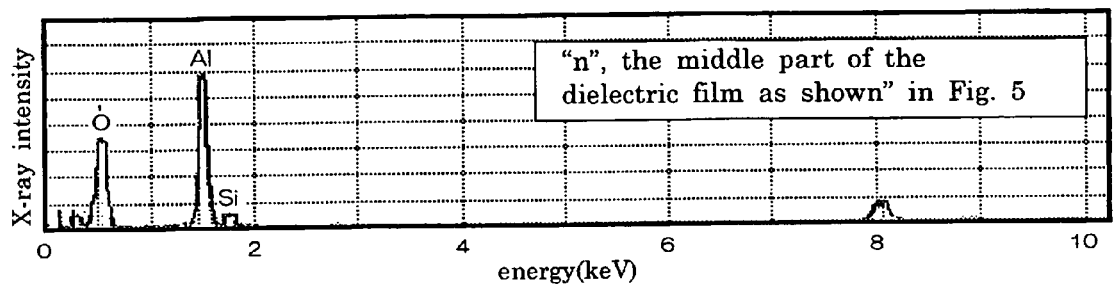
Figure 6:
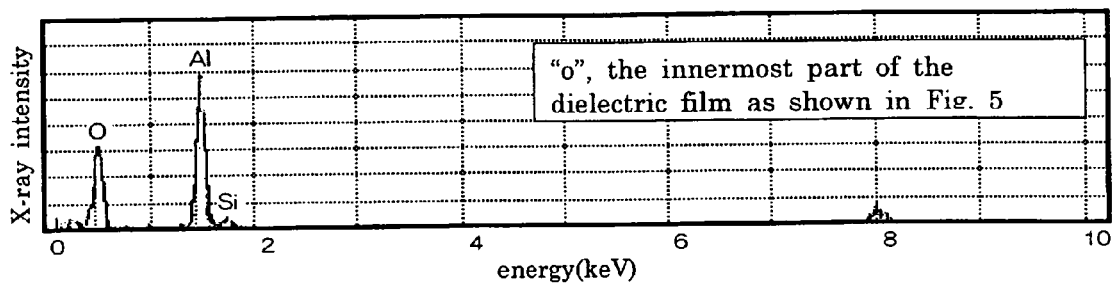
Figure 6:
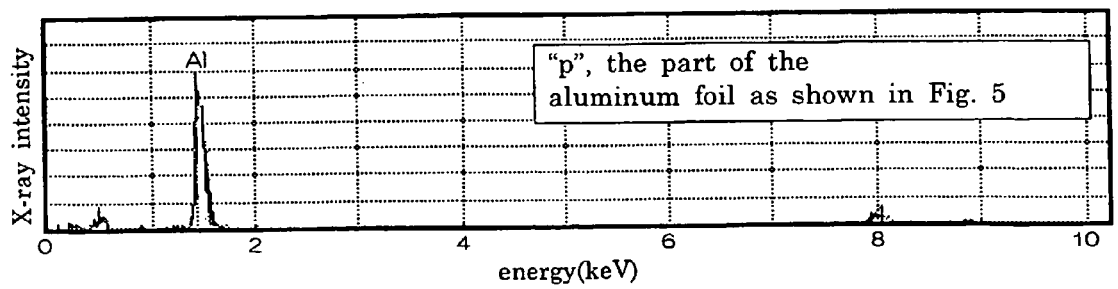
Figure 7:
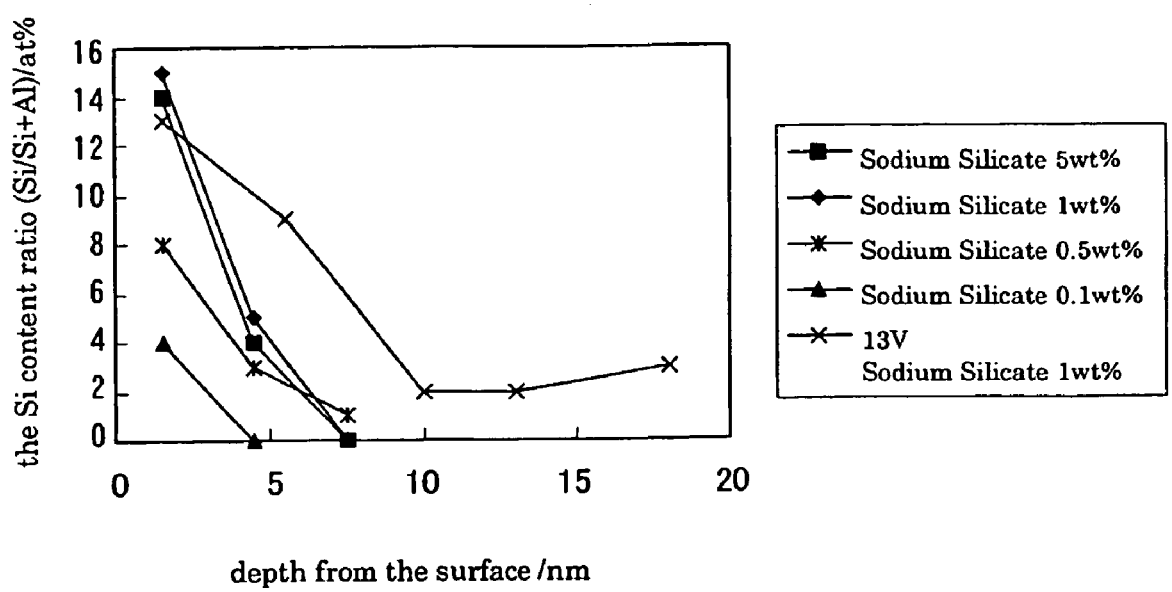
FIG. 7 shows results of measurement on the Si content ratio from the surface toward the inner part of the foil in cases where the aluminum formed foil was electrochemically formed using sodium silicate solutions of various concentrations.

Thereafter, the foil was electrochemically formed using aqueous sodium silicate solutions having concentration of 0.1 mass %, 0.5 mass %, 1.0 mass % and 5.0 mass % respectively, under the conditions such that the temperature was 40° C., the voltage was 4 V, the current density was 5 mA/cm$^2$ and the current passing time was 10 minutes. With respect to the case using 1.0 mass % sodium silicate solution, the foil was analyzed by TEM and TEM-EDX. FIGS. 5 and 6 show the results confirming that Si was present in the foil and the content of Si continuously decreased from the surface toward the inner part of the foil. With respect to the other cases (using sodium silicate solutions having concentration of 0.1 mass %, 0.5 mass %, or 5 mass %), the foil of each case was analyzed by TEM and TEM-EDX. FIG. 7 plots out the results as a profile of the Si content toward the inner part which were obtained by calculating the content ratio defined as (Si) mol/((Si) mol+(Al) mol) based on mole values measured by TEM and TEM-EDX analysis, including the result of the former case (using 1.0 mass % sodium silicate solution). The content ratio of Si in the part near the surface of the aluminum oxide dielectric film fell within the range of 4 to 15% while the content of Si present in the part 1.5 nm deep to 4.5 nm deep from the surface decreased inwardly at a rate of 1.3 to 4%/nm.

Subsequently, the resulting formed foil was heat-treated at 350° C. for 3 minutes and then electrochemically formed using an aqueous 10 mass % ammonium adipate solution as the electrolytic solution under the conditions such that the temperature was 55° C., the voltage was 4 V, the current density was 5 mA/cm$^2$ and the current passing time was 10 minutes. The electrochemically formed foil obtained through these treatments was measured on the electrostatic capacitance using 10 mass % ammonium adipate for the electrolytic solution. The results are shown in Table 2.

Thereafter, the cathode part was dipped in 1 mol/liter of an isopropyl alcohol solution of 3,4-ethylenedioxythiophene, left standing for 2 minutes, then dipped in a mixed aqueous solution of an oxidizing agent (1.8 mol/liter of ammonium persulfate) and a dopant (0.06 mol/liter of sodium anthraquinone-2-sulfonate), and left standing at 45° C. for 5 minutes. This process was repeated 25 times, the foil was washed with water, an electrically conducting polymer layer (5) was formed and thereon, a carbon paste and a silver paste were sequentially stacked to form an electrically conducting layer, thereby obtaining a capacitor element shown in FIG. 1. Subsequently, two sheets of the elements were superposed and disposed on a lead flame through a silver paste in the cathode side and by the welding in the anode side. Thereafter, the whole was molded with a resin for molding to complete a capacitor. After aging at 2 V and 105° C. for 1 hour, the electrostatic capacitance and the leakage current property were measured. The results obtained are shown in Table 2.

EXAMPLE 9

A capacitor was manufactured by the same operation as Example 8 except that a formed aluminum foil (100LJA19B13Vf, trade name, produced by Japan Capacitor Industrial Co., Ltd. (JCC)) (rated film withstand voltage: 13 Vf) was used and that the foil was electrochemically formed with aqueous sodium silicate solutions having concentration of 0.1 mass % and 1.0 mass % in place of 0.1 mass %, 0.5 mass %, 1.0 mass % and 5.0 mass %, at the voltage of 13V in place of 4 V.

Subsequently, the obtained capacitor was measured on the electrostatic capacitance and the leakage current property after aging at 6.3 V and 105° C. for 1 hour. The results obtained are shown in Table 2. The results are shown in Table 2. TEM and TEM-EDX analyses were made in the same manner as Example 8. FIG. 7 plots out the results as a profile of the Si content toward the inner part which were obtained by calculating the content ratio defined as (Si) mol/((Si) mol+(Al) mol) based on mole values measured by TEM and TEM-EDX analyses. The content ratio of Si in the part near the surface of the aluminum oxide dielectric film was 13% while the content of Si present in the part 1.5 nm deep to 5.5 nm deep from the surface decreased inwardly at a rate of 1%/nm.

COMPARATIVE EXAMPLE 7

A capacitor was manufactured by the same operation as in Example 8 except for using an aqueous 10 mass % ammonium adipate solution in place of an aqueous sodium silicate solution, and then measured on the electrostatic capacitance and the leakage current property. Also, the electrostatic capacitance of the electrochemically formed foil obtained through these electrochemically forming treatments was measured using 10 mass % ammonium adipate for the electrolytic solution. The result are shown in Table 2. Si was not detected in the formed foil through TEM-EDX analysis.

COMPARATIVE EXAMPLE 8

A capacitor was manufactured by the same operation as in Comparative Example 7 except for changing the formed foil to 13 Vf foil (100LJA19B13Vf, trade name, produced by Japan Capacitor Industrial Co., Ltd. (JCC)) (rated film withstand voltage: 13Vf) and the electrochemical forming voltage to 13 V. After aging at 6.3 V and 105° C. for 1 hour, the electrostatic capacitance and the leakage current property were measured. The results are shown in Table 2. Si was not detected in the formed foil through TEM analyses. The leakage current value (LC) was measured 1 minute after the application of a rated voltage (6.3 V) to the capacitor element, the measured value was calculated with a threshold value of 0.03 CV, and the obtained value was used as a leakage current (LC) yield for the evaluation.

TABLE 2

| | Electrostatic Capacitance (μF) | Deviation of Electrostatic Capacitance (μF) | LC (*2) Yield (%) | Capacitance (*3) of Formed Foil before Attaching of Solid Electrolyte (μF/cm²) |
|---|---|---|---|---|
| Example 8 (0.1%) (*1) | 65.66 | 4.12 | 94 | 334 |
| Example 8 (0.5%) | 66.92 | 3.89 | 95 | — |
| Example 8 (1.0%) | 66.78 | 3.57 | 97 | — |
| Example 8 (5.0%) | 64.05 | 2.13 | 96 | — |
| Example 9 | 35.67 | 5.54 | 96 | 144 |
| Comparative Example 7 | 51.01 | 7.41 | 60 | 331 |
| Comparative Example 8 | 29.95 | 9.58 | 71 | 142 |

(*1) Concentration rate of the sodium silicate used
(*2) LC: leakage current
(*3) Electrostatic capacitance when a 10% ammonium adipate solution was used as the electrolytic solution.

It is seen from Table 2 that, with respect to the formed foil obtained by the electrochemically forming with an aqueous sodium silicate solution, the electrostatic capacitance of the foil in the electrolytic solution is on the same level as compared with the foil treated with the aqueous ammonium adipate solution in Comparative Examples 7 and 8, while the electrostatic capacitance (μF) of the capacitor is increased. Furthermore, the electrostatic capacitance deviation (dispersion) and the leakage current (LC) yield (%) are also improved.

Also, it is seen from the results of TEM and TEM-EDX analyses shown in FIGS. 5, 6 and 7 that Si is present in the formed foil comprising an aluminum oxide dielectric film and the content of Si continuously decreases from the surface side of the aluminum oxide dielectric film toward the inner part. Furthermore with respect to the Si content, it is seen from FIG. 7 that more preferably, the content ratio of Si defined as (Si) mol/((Si) mol+(Al) mol) based on mole values measured by TEM and TEM-EDX analyses is 4% or more in the surface side of the aluminum oxide dielectric film, and the Si content continuously decreases toward the inner part at a rate of 0.5%/nm or more in some regions of the formed foil.

INDUSTRIAL APPLICABILITY

As described in the foregoing pages, the formed substrate of the present invention, comprising a formed foil having an aluminum oxide dielectric film where at least a part of the dielectric layer surface is covered with an oxide comprising Si, valve-acting metal element (e.g., Al) and O, and preferably, wherein the content of Si present in the formed foil decreases continuously from the surface toward the inner part, is uniformalized on the formed film surface and improved in the adhesion with an electrically conducting polymer (solid electrolyte). The solid electrolytic capacitor using this substrate is increased in the electrostatic capacitance, reduced in the dispersion of electrostatic capacitance among individual electrostatic capacitors and improved in the LC yield as compared with capacitors otherwise manufactured.

Moreover, the extruded portion (bur) at the cut end edge, which is chamfered through dissolution, contributes to improvement of electrical properties of the capacitor such as LC.

The invention claimed is:

1. A formed substrate, which is a valve-acting metal substrate having a dielectric film, wherein the surface of the valve-acting metal having a dielectric film is at least partially covered with an oxide comprising Si, valve-acting metal element and O, wherein the content of Si present in the foil decreases continuously from the surface of the dielectric film toward the inner part in some regions in thickness of the dielectric film, the content ratio of Si measured by TEM-EDX and defined by the following formula:

$$Si \text{ content ratio} = \frac{(Si) \text{ mol}}{(Si) \text{ mol} + (\text{value-acting metal element}) \text{ mol}}$$

is 4% or more at the surface and decreases continuously toward the inner part at a rate of 0.5%/nm or more in some regions in thickness of the aluminum oxide dielectric film, and the valve-acting metal substrate is selected from the group consisting of aluminum, tantalum, titanium, niobium and alloys thereof.

2. The formed substrate as claimed in claim 1, wherein the valve-acting metal substrate is a formed aluminum foil or plate.

3. The formed substrate as claimed in claim 2, wherein in the XPS analysis on the surface of the formed substrate having an aluminum oxide dielectric film at least partially covered with an oxide comprising Si, Al and O, when the binding energy of Si metal is 99.7 eV and the binding energy of Si in $SiO_2$ is 103.4 eV, the binding energy of Si in the oxide is from 100.0 to 103.2 eV.

4. The formed substrate as claimed in claim 2, wherein in the XPS analysis on the surface of the formed substrate having an aluminum oxide dielectric film at least partially covered with an oxide comprising Si, Al and O, when the binding energy of O in $Al_2O_3$ is 531.0 eV and the binding energy of O in $SiO_2$ is 532.5 eV, the binding energy of O in the oxide is from 529.0 to 532.3 eV.

5. The formed substrate as claimed in claim 4, wherein the oxide comprising Si, Al and O contains a compound having an Si-O-Al bond.

6. The formed substrate as claimed in claim 1, wherein the valve-acting metal substrate having a dielectric film is electrochemically formed at a voltage of less than 20 V.

7. A method of making a formed substrate, which is a valve-acting metal substrate having a dielectric film, wherein the surface of the valve-acting metal having a dielectric film is at least partially covered with an oxide comprising Si, valve-acting metal element and O, wherein the content of Si present in the foil decreases continuously from the surface of the dielectric film toward the inner part in some regions in thickness of the dielectric film, the content ratio of Si measured by TEM-EDX and defined by the following formula:

$$Si \text{ content ratio} = \frac{(Si) \text{ mol}}{(Si) \text{ mol} + (\text{value-acting metal element}) \text{ mol}}$$

is 4 % or more at the surface and decreases continuously toward the inner part at a rate of 0.5 %/nm or more in some regions in thickness of the aluminum oxide dielectric film, and the valve-acting metal substrate is selected from the group consisting of aluminum, tantalum, titanium, niobium and alloys thereof, said method comprising:

subjecting said valve-acting metal substrate to electrochemical formation using an electrolytic solution containing alkali silicate so as to at least partially cover the surface of the valve-acting metal with an oxide comprising Si, valve-acting metal element and O.

8. The method of making a formed substrate as claimed in claim 7, wherein said valve-acting metal substrate comprises aluminum.

9. The method of making a formed substrate as claimed in claim 8, which comprises electrochemically forming the aluminum substrate using an electrolytic solution containing an acid and/or a salt thereof, and electrochemically forming the substrate using an electrolytic solution containing alkali silicate, wherein the surface of the valve-acting metal is at least partially covered with an oxide comprising Si, aluminum and O.

10. The method of making a formed substrate as claimed in claim 8, which comprises electrochemically forming the aluminum substrate using an electrolytic solution containing an acid and/or a salt thereof, electrochemically forming the substrate using an electrolytic solution containing alkali silicate, and treating the substrate with heat, wherein the surface of the valve-acting metal is at least partially covered with an oxide comprising Si, aluminum and O.

11. The method of making a formed substrate as claimed in claim 7, wherein the concentration of the electrolytic solution containing alkali silicate is within the range of 0.001 to 15 mass %.

12. The method of making a formed substrate as claimed in claim 7, wherein the temperature of the electrolytic solution containing alkali silicate is within the range of 10 to 100° C.

13. The method of making a formed substrate as claimed in claim 7, wherein alkali silicate contained in the electrolytic solution is at least one selected from the group consisting of potassium silicate, sodium silicate, calcium silicate and lithium silicate.

14. The method of making a formed substrate as claimed in claim 8, wherein the electrochemical formation is performed at a voltage of less than 20 V.

15. A solid electrolytic capacitor comprising a solid electrolyte formed on the formed substrate as claimed in claim 1.

16. A solid electrolytic capacitor comprising a solid electrolyte formed on the formed substrate obtained by the method as claimed in claim 7.

17. The solid electrolytic capacitor as claimed in claim 16, wherein the solid electrolyte comprises a $\pi$ electron-conjugate polymer.

18. The solid electrolytic capacitor as claimed in claim 17, wherein the $\pi$ electron-conjugate polymer is a polymer obtained from a 5-membered heterocyclic compound.

19. The solid electrolytic capacitor as claimed in claim 18, wherein the 5-membered heterocyclic compound is at least one member selected from the group consisting of pyrrole, thiophene, furan, isothianaphthene, 1,3-dihydroisothianaphthene and substitution derivatives thereof.

20. The solid electrolytic capacitor as claimed in claim 19, wherein the 5-memebered heterocyclic compound is at least one member selected from the group consisting of 3,4-ethylenedioxythiophene and 1,3-dihydroisothianaphthene.

21. The solid electrolytic capacitor as claimed in claim 16, wherein the solid electrolytic capacitor is obtained by stacking two or more sheets of capacitor elements.

* * * * *